July 19, 1955  M. K. COSKUN  2,713,400
ROTOR BRAKE

Filed July 23, 1953  2 Sheets-Sheet 1

INVENTOR.
Mehmet Kemal Coskun
BY
Orvin O. B. Garner
Atty.

July 19, 1955  M. K. COSKUN  2,713,400
ROTOR BRAKE

Filed July 23, 1953  2 Sheets-Sheet 2

INVENTOR.
Mehmet Kemal Coskun
BY
O. B. Garner
Atty.

United States Patent Office 2,713,400
Patented July 19, 1955

2,713,400

ROTOR BRAKE

Mehmet Kemal Coskun, Granite City, Ill., assignor to American Steel Foundries, Chicago, Ill., a corporation of New Jersey Application July 23, 1953, Serial No. 369,778

12 Claims. (Cl. 188—59)

This invention relates to brakes and more particularly to a novel disk or rotor brake associated with a railway car truck.

A primary object of the invention is to devise a disk brake of economical construction having relatively few parts and capable of long life in service.

A more specific object of the invention is to provide means for guiding the brake heads for linear movement toward and away from each other to apply and release the brake.

Another object of the invention is to provide a single brake lever operatively connected to both brake heads for actuation thereof.

A further object of the invention is to provide a novel torque connection between the brake heads and their supporting truck part, said connection comprising novel release means for the brake head.

The foregoing and other objects and advantages of the invention will become apparent from a consideration of the following specification and the accompanying drawings, wherein.

Figure 1:
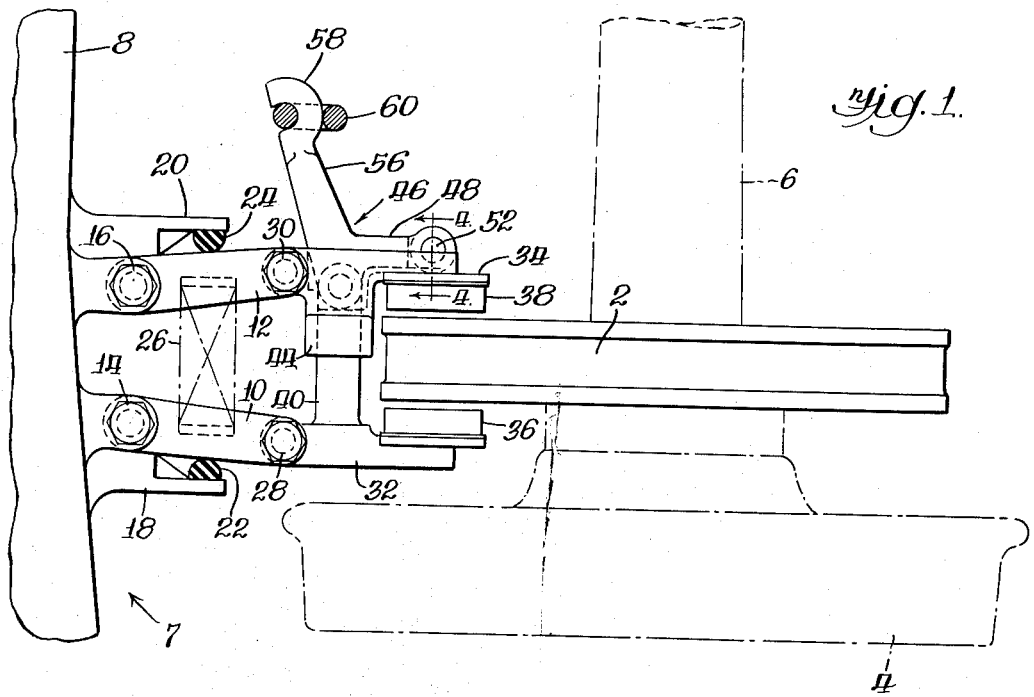
Figure 1 is a top plan view of a brake device embodying the invention as applied to a conventional freight car truck which is fragmentarily illustrated in phantom lines.
Figure 2:
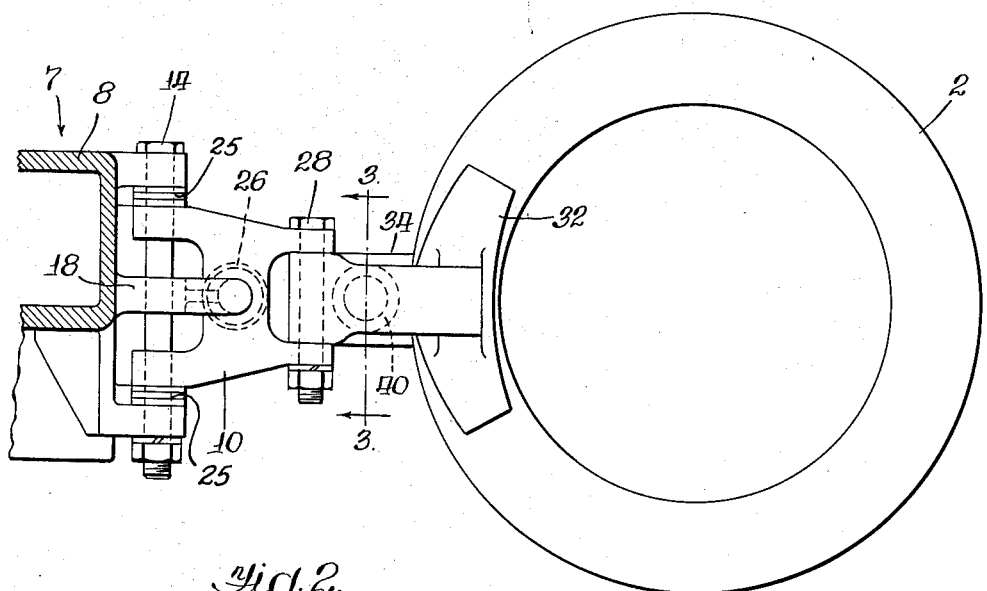
Figure 2 is a side elevational view of the device shown in Figure 1 with a portion of the truck bolster broken away in vertical section.

Describing the invention in detail, the novel brake is illustrated as applied to a rotor 2 of a wheel 4 and axle 6 assembly of a conventional railway freight car truck generally designated 7 and having a bolster member 8 carried in the usual manner by side frames (not shown) supported by the wheel and axle assembly.

The novel brake comprises spaced outboard and inboard links 10 and 12 pivoted as by bolt and nut assemblies 14 and 16 respectively to the member 8 which is provided with arms 18 and 20 carrying resilient bumpers 22 and 24 for engagement with the links 10 and 12, respectively, in the released position of the brake illustrated in the drawings.

The links 10 and 12 are preferably provided with washers 25 sleeved on the bolt and nut assemblies 14 and 16 to adjust the vertical position of the links as may be desirable in service. Thus, if the links are to be raised, one or more washers 25 are removed from above each link and are inserted therebelow; and if the links are to be lowered one or more washers 25 are removed from below each link and are inserted thereabove.

The links 10 and 12 are urged to their released position against the bumpers by a compression spring diagrammatically illustrated at 26 as a coil spring compressed between the links which are pivoted as at 28 and 30, respectively, to brake heads 32 and 34 carrying friction shoes 36 and 38, respectively, for frictional engagement with opposite sides of the rotor 2 upon application of the brake to decelerate rotation of the wheel 4 and axle 6 assembly.

Figure 3:
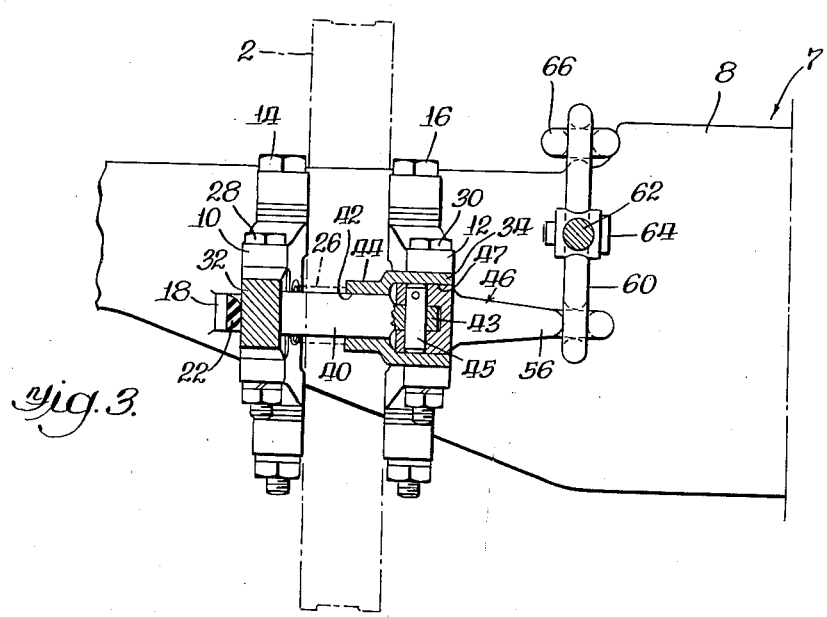
Figure 3 is a sectional view on the line 3—3 of Figure 2.

The brake head 32 is provided with a preferably cylindrical plunger 40 sleeved within a complementary opening or bore 42 in a boss 44 formed on the inboard side of the brake head 34, and the plunger 40 comprises a tongue or lug 43 pivotally connected as by a pin 45 to the elbow of a bell crank lever 46 within a jaw 47 (Figure 3) of the brake head 34, said jaw 47 preventing accidental disassembly of the pin 45.

Figure 4:
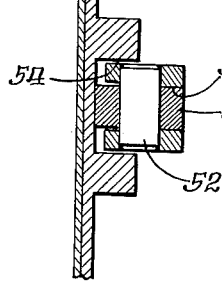
Figure 4 is a sectional view on the line 4—4 of Figure 1.

The bell crank lever comprises an arm 48 having a jaw 50 (Figure 4) within which a roller 51 is pivotally mounted as by a pin 52 within a jaw 54 of the brake head 34, the roller 51 engaging the brake head 34 for actuation thereof as hereinafter described.

The bell crank lever also comprises an arm 56 having a hook portion 58 for convenient connection to associated actuating means such as a lever 60 which may be operatively connected to actuating means such as a conventional compressed air piston and cylinder device (not shown), as by a pull rod 62 (Figure 3) pivoted thereto as as 64. The upper end of lever 60 may be pivoted to a pull rod 66 which may be connected by any desired linkage (not shown) to a lever 56 of a similar brake device at the opposite side of bolster 8.

Upon actuation of the bell crank lever 46 it rotates about the pin 45 in a clockwise direction as seen in Figure 1, to engage the brake shoe 38 with one side of the rotor 2, whereupon the lever 46 rotates about the pin 52 in a clockwise direction as seen in Figure 1 to pull the brake shoe 36 into engagement with the opposite side of the rotor 2. Upon release of the lever 46 the spring 26 returns the parts to released position shown in the drawings.

It will be noted that during movement of the brake shoes 36 and 38 toward and away from each other, the shoes and the brake heads 32 and 34 to which they are attached, are confined to substantially linear movement by engagement of the plunger 40 within the bore 42. When the shoes 36 and 38 are clamped by the lever 46 against opposite sides of the rotor 2 during the brake application, there may be a tendency in certain types of railway car trucks for the wheel and axle assembly to move lengthwise thereof relative to the bolster member 8, thereby delivering an impact to one of the shoes. In such case, if the pivot points 14, 16, 28 and 30 are arranged in a parallelogram, such impacts will be delivered either to the bumper 22 or the bumper 24 without developing substantial stresses in the plunger 40 or the boss 44.

Figure 5:
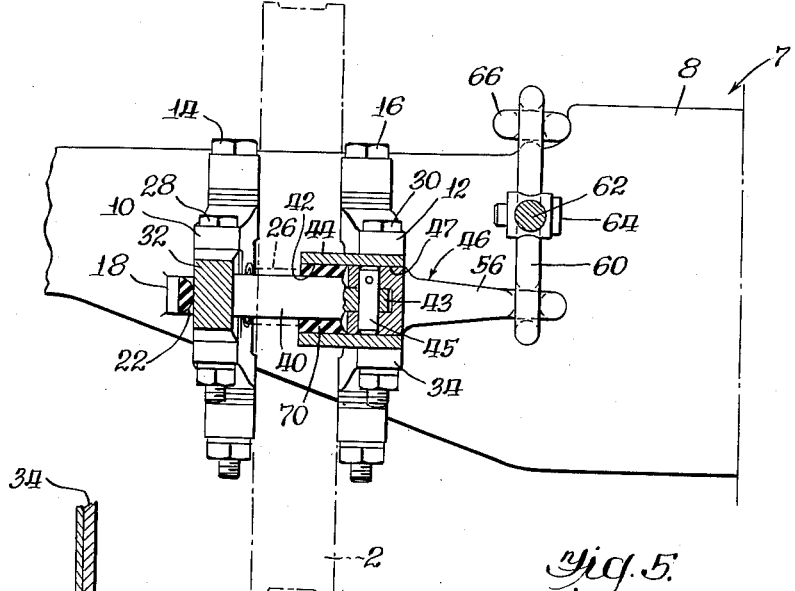
Figure 5 is a sectional view corresponding to Figure 3 but illustrating a modification of the brake device.

However, due to the necessary commercial tolerances in the manufacture of a device of this type and due also to the effect of brake shoe wear upon the position of the pivot points 28 and 30 when the brake shoes are engaged with the rotor 2 during a braking operation, such lateral impacts against the shoes 36 and 38 due to relative movement of the member 8 and wheel and axle assembly lengthwise of the wheel and axle assembly when the brake is applied, may cause the plunger 40 to rotate or twist slightly on a substantially horizontal axis relative to the boss 44. In trucks where such impacts on the brake shoes are significant, some provision should be made to prevent damage to the plunger 40 and boss 44 as a result of the above described action, and Figure 5 illustrates a slight modification of the invention wherein such means are provided in the form of a resilient bushing 70 sleeved over the plunger 40 and fixed within the bore 42 of the boss 44. The device illustrated in Figure 5 is otherwise identical with that shown in Figures 1 to 4, and corresponding parts are identified by corresponding numerals.

I claim:

1. In a rotor brake for a railway car truck comprising a wheel and axle assembly and a structural member supported thereby; the combination of spaced brake heads at opposite sides of a rotatable part of said assembly, a plunger on one of said brake heads received within a complementary opening of the other brake head to guide said heads for substantially linear movement toward and away from each other during actuation and release respectively of said brake, a pair of links pivoted to said member for transmitting brake torque thereto, said links being pivoted respectively to said heads, resilient bumper means carried by said member for engagement with the remote sides of said links, a release spring compressed between said links, and actuating means for said heads comprising a bell crank lever pivoted to said plunger and operatively connected to said other head.

2. A rotor brake according to claim 1, wherein said operative connection comprises a roller engaging said other head, a pin pivoting said roller to said lever, and a jaw on said other head confining the ends of the pin to prevent accidental disassembly thereof.

3. A rotor brake according to claim 1, wherein a resilient bushing is disposed within said opening surrounding said plunger.

4. In a rotor brake for a railway car truck comprising a wheel and axle assembly and a structural member supported thereby; the combination of spaced brake heads at opposite sides of a rotatable part of said assembly, connecting means on one of said brake heads extending through an opening through the other brake head, a pair of links pivoted to said member, said links being pivoted respectively to said heads, a release spring compressed between said links, and actuating means for said heads comprising a lever system operatively connected to said connecting means and to said other head.

5. In a rotor brake for a railway car truck comprising a wheel and axle assembly and a structural member supported thereby; the combination of spaced brake heads at opposite sides of a rotatable part of said assembly, one of said heads having a portion extending into a jaw of the other head, actuating means for said heads comprising a lever extending into said jaw, a pin passing through complementary openings of said lever and portion, said pin being confined at its ends to prevent accidental disassembly of the pin, an operative connection between said lever and said other head, and means for transmitting braking torque from said heads to said member.

6. A rotor brake according to claim 5, wherein said operative connection comprises a roller engaging said other head, a jaw on said lever confining said roller, a pin passing through complementary openings of the roller and the jaw confining said roller, and a jaw on said other head confining the ends of the pin to prevent accidental disassembly thereof.

7. A rotor brake according to claim 5, wherein the torque transmitting means are characterized by links pivoted to the structural member and pivoted respectively to the brake heads, and wherein the release spring is operatively associated with the links for resiliently urging them away from each other.

8. In a rotor brake for a railway car truck comprising a wheel and axle assembly and a structural member supported thereby; the combination of a brake disk on said assembly, spaced brake heads on opposite sides of said disk, a plunger in one of said brake heads received within an opening of the other brake head, a pair of links pivoted to said member for transmitting brake torque thereto, said links being pivoted respectively to said heads, resilient bumper means carried by said member for engaging the links in released position thereof, release spring means for yieldingly urging the links into engagement with said bumper means, and actuating means for said heads operatively connected to said plunger and said other head.

9. A rotor brake according to claim 8, wherein the plunger is resiliently bushed within the openings of said other head.

10. A brake comprising a support, links pivoted thereto, brake heads pivoted to respective links, rotatable means between said brake heads to be braked thereby, and means for clamping said rotatable means between said heads comprising a bell crank directly pivoted to both heads, said crank being free from connection to said link.

11. A brake comprising a support, links pivoted thereto, brake heads pivoted to respective links, rotatable means between said heads to be braked thereby, one of said heads having a portion extending through an opening of the other head, and actuating means for said heads operatively connected to said portion and to said other head.

12. A brake comprising a support, brake heads, means pivoted to the support and brake heads for supporting the latter and for accommodating movement of the heads toward and away from each other, a rotatable member between said heads to be braked thereby, means interconnecting said heads for guiding them in linear movement toward and away from each other, and actuating means comprising a bell crank pivoted at its elbow to one head and having an arm pivotally connected to the other head, said bell crank being spaced from said first mentioned means.

References Cited in the file of this patent

UNITED STATES PATENTS

| 2,348,078 | Ledwinka | May 2, 1944 |
| 2,375,152 | Turner | May 1, 1945 |
| 2,449,636 | Baselt | Sept. 21, 1948 |
| 2,464,680 | Gaenssle | Mar. 15, 1949 |